United States Patent [19]

Will

[11] Patent Number: 4,673,064

[45] Date of Patent: Jun. 16, 1987

[54] REAR DISK BRAKE CONVERSION KIT

[76] Inventor: Alan L. Will, 4411 W. Calavar, Glendale, Ariz. 85306

[21] Appl. No.: 855,909

[22] Filed: Apr. 25, 1986

[51] Int. Cl.$^4$ .............................................. B60T 1/06
[52] U.S. Cl. ................................ 188/18 A; 29/401.1; 188/71.1; 188/382; 206/335; 301/6 WB; 301/9 DN
[58] Field of Search ............. 188/382, 78, 18 R, 18 A, 188/205 R, 206 R, 71.1-73.47, 325; 29/401.1, 402.03; 180/313; 206/335, 216, 223, 303; 301/36, 6 E, 6 WB, 9 DN, 6 V

[56] References Cited

U.S. PATENT DOCUMENTS

| | | | |
|---|---|---|---|
| 2,884,693 | 5/1959 | Wagner | 188/71.1 X |
| 3,494,669 | 2/1970 | Rappert | 301/9 DN |
| 3,820,638 | 6/1974 | Ebey | 188/18 R X |
| 3,955,650 | 5/1976 | Ellis | 188/71.1 |
| 4,049,085 | 9/1977 | Blunier | 188/18 A |
| 4,061,229 | 12/1977 | Ohtsuka | 206/335 X |
| 4,150,736 | 4/1979 | Marti | 188/18 R X |
| 4,261,446 | 4/1981 | Bolger | 29/401.1 X |
| 4,363,385 | 12/1982 | Schlanger | 29/401.1 X |
| 4,396,232 | 8/1983 | Fox | 301/9 DN X |

OTHER PUBLICATIONS

"Disc Brake Update", pp. 88–90, from the magazine Hot VWs, published Jun. 1986, ISSN 0012-7132.

Primary Examiner—Douglas C. Butler
Attorney, Agent, or Firm—Charles P. Padgett, Jr.

[57] ABSTRACT

The present invention includes a conversion kit having substantially four pairs of pieces including a pair of rotors, a pair of calipers, a pair of bracket plates, and a pair of hub inserts along with the necessary fastening structure. The installation or conversion is as follows: The drum brake is completely removed from the axle and the new rotor is mounted thereon. The rotor is bored out to form a longitudinal cylindrical channel therethrough and the hub insert having an elongated cylindrical portion and a flanged portion is force-fitted with the hollow elongated aperture of the hub until the flange is force-fitted within a circular recess on the outer face of the hub and fastened there so that its face is generally coplanar with the face of the hub. The rear surface mounting structure on the core of the hub is aligned with mounting apertures in one end of the bracket plate and with mounting apertures in the flange at the end of the axle and fastening structure are inserted therethrough for securing them fixedly together. The caliper is mounted to apertures in the opposite end of bracket plate which operatively positions the caliper with its slot about the outer peripheral edge portion and sides of the disk for conventional disk braking purposes, as known in the art.

4 Claims, 7 Drawing Figures

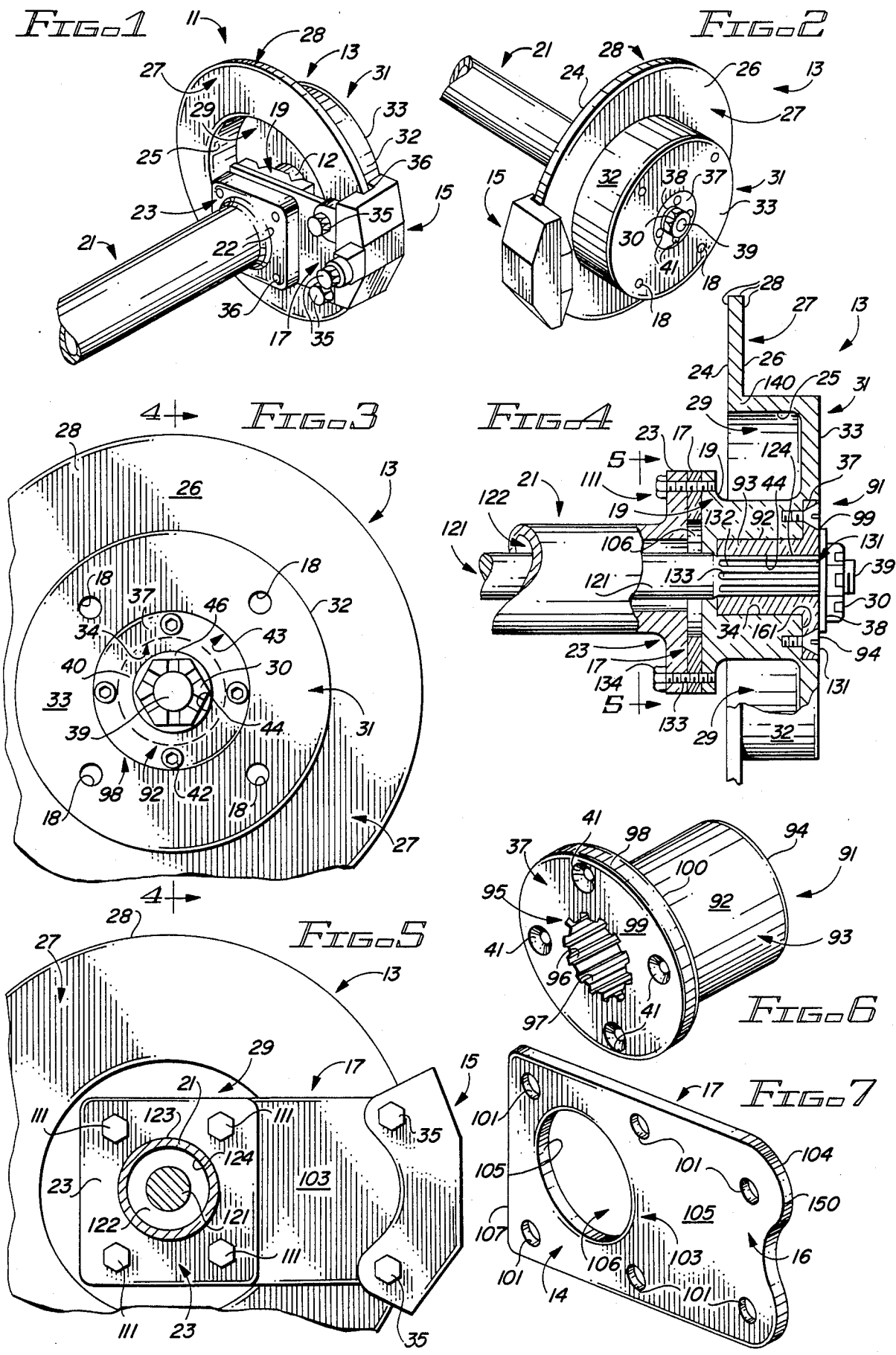

REAR DISK BRAKE CONVERSION KIT

BACKGROUND OF THE INVENTION

1. Field of the Invention

This invention relates generally to a disk brake kit, and more particularly for a kit for converting the rear drum brakes of a motor vehicle which is normally provided with only front disk brakes and rear drum brakes, to rear disk brakes.

2. Description of the Prior Art

For many years, certain motor vehicles, such as the classic VW "bug" or Volkswagon, has been stripped down and "souped" up and used for many purposes including dune buggies, off road vehicles, lightweight racing vehicles and the like. One of the major concerns with persons having such vehicles lies in the fact that the vehicle is originally made only with front disk brakes. It always comes with rear drum brakes. Anyone who uses this motor vehicle for off-road purposes such as for a dune buggy, a street hot rod, or the like knows that front and rear disk brakes are far superior to front disk alone brakes for many reasons and purposes. However, there has been no way, in the prior art, to order this vehicle from the factory with rear disk brakes, and there has been no way to easily convert from drum brakes to disk brakes regardless of several decades of long-felt and unfulfilled need for such a conversion kit.

Therefore, the present invention seeks to provide a kit or apparatus means, as well as a method, for converting the rear drum brakes of such a vehicle to rear disk brakes in such a manner that it can be done using Applicant's kit by anyone of ordinary skill in the automotive arts.

SUMMARY OF THE INVENTION

It is an object of the present invention to provide a kit for converting the rear drum brakes of a motor vehicle to rear disk brakes.

It is another object of the present invention to provide a kit means enabling someone less than a skilled mechanic to quickly and easily convert the rear drum brakes of a motor vehicle which is normally equipped with only front disk brakes and rear drum brakes, to rear disk brakes.

It is another object of the present invention to provide a mechanically simple, easy-to-install, easy-to-maintain, safe, rear disk brakes to replace the rear drum brakes of a motor vehicle not normally provided with rear disk brakes.

It is yet another object of the present invention to provide a method for converting the rear drum brakes of a motor vehicle provided only with rear drum brakes to rear disk brakes.

It is still another object of this invention to provide a kit assembly which enables a person of ordinary mechanical skills to convert a predetermined motor vehicles's drum brake to a disk brake quickly and easily and at a minimal cost.

The present invention provide a kit assembly or kit apparatus for converting the rear drum brakes of a motor vehicle which is originally provided with only rear drum brakes. A rotor assembly is provided which includes a genreally elongated, cylindrical hub having a generally cylindrical solid core passing therethrough. Means are provided for forming a hollow annular space between the outer periphery of the core and the inner periphery of the hub. One end of the hub terminates in an integral disposed face which is generally perpendicular to the axis of the elongated cylindrical hub while the opposite end of the core terminates in a first mounting means having first mounting apertures. The hub includes an annular disk integral with the peripheral end of the hub and extending radially outward therefrom. Means are provided for forming an axial cylindrical bore having a first diameter completely through the solid core of the hub, and a means for providing a circular recess in the face of the hub, co-axial with the bore, and with the recess having a second diameter substantially greater than the first diameter of the axial cylindrical bore.

A conventional caliper having caliper-mounting apertures and a braking slot for operatively engaging the outer peripheral sides of the annular disk for braking purposes is provided. A bracket plate having one end portion provided with mounting apertures corresponding to the mounting apertures of said hub core and an opposite end provided with mounting apertures corresponding to the mounting apertures of said calipers is provided. The intermediate portion of the bracket plate providing the necessary spacing for accurately positioning a caliper a predetermined radially distance from the axis of the hub for operatively mounting the caliper operatively over the peripheral edge portion of the disk for braking purposes.

A hub insert means is provided which includes an elongated, cylindrical insert portion having a diameter substantially equal to but greater than the first diameter of the cylindrical bore and an annular circular flange operatively disposed at and integral with one end of the hub insert wherein the flange has a diameter which is substantially equal to but greater than the second diameter of the recess. An elongated cylindrical portion of the hub insert means includes means for forming a circular axial bore through the elongated cylindrical portion of said insert and for forming a lesser diametered aperture through the center of said flange so that said aperture and said bore are coaxial with one another. The elongated cylindrical portion of the hub insert is force-fitted within the axial cylindrical bore of the solid core portion of the hub from the face end until the flange portion of the hub insert is force-fitted within the recess and the outer surface of the flange is coplanar with the outer surface of the face of the hub.

Means are provided for fastening the flange to the core. The interior axial bore of the hub insert is provided with internal spline means for operatively engaging the splined end portion of the drive rod within an axle of a car. The outer threaded tip of the splined portion of the drive rod extends through the aperture in the flange and a gland nut means is threadedly secured thereto for removably fastening the drive rod to the rotor assembly so as to be driven thereby. The mounting apertures of the caliper are aligned with the mounting apertures at the opposite end of the bracket plate and fastening means is secured through the aligned apertures for securing the caliper in operable position with respect to the disk. Furthermore, the mounting apertures of the surface of the core, the first end of the bracket plate, and the inner distal end of the axel are aligned with one another and are provided with fastening means passing therethrough for fixedly securing same together.

The present invention also contemplates a method of manufacturing and converting drum brakes to disk brakes. The drum brakes are first removed and a rotor assembly is provided. A central axial channel is bored in the rotor with the central axial channel having a first diameter. A circular annular recess is formed on the face of the rotor and a channel is bored through the center of the face of the recess so as to be co-axial and coextensive with the central axial channel passing through the rotor. The hub insert is then machined to have a generally elongated, cylindrical portion having an outer, annular, integral flange on one end thereof.

A cylindrical portion has a diameter substantially equal to but greater than the first diameter while the flange has a diameter substantially equal to but greater than the diameter of the formed recess. A central, axial, generally cylindrical bore is made throughout the elongated portion of the insert and aperture is formed in the flange at the end of the hub insert with the aperture being co-axial with and having a lesser diameter than the central axial bore. Alignment means are interiorly formed within the generally circular bore of the interior of the hub insert The elongated cylindrical portion of the hub insert is force-fitted within a central axial channel until the flange portion is force-fitted within the recess such that the plane of the outer surface of the flange is coplanar with the face of the hub. The flange is then fastened in a central portion of the hub and a disk brake caliper having a slot and caliper connection apertures are provided. A bracket assembly is provided which has a first set of mounting apertures at one end portion and a second set of mounting apertures at the opposite end portion. The second set of mounting apertures is adapted to be aligned with the mounting apertures of the caliper and fastening means are engageable therewith for operatively securing the caliper in axial relationship to the rotor such that the slot of the caliper is operatively engages the outer side portions of the rotor assembly for braking purposes, as known in the art.

The opposite end of the bracket has its apertures aligned with the first mounting apertures on the end of the core of the hub assembly and with the mounting apertures of a bracket or flange disposed at the end of the hollow axle housing the driven rod. Fastening means can be connected through the aligned apertures for fixedly securing same together. The aligned end portion of the driven shaft within the axle is operatively disposed within the interiorly splined, generally circular bore of the hub insert for drivably engaging same while the outer threaded end portion of the driven rod passes through the aperture of the flange and operatively receives a gland nut means thereon for removably securing the driven rod and the rotor assembly.

These and other objects and advantages of the present invention will be more fully understood after reviewing the detailed description of the invention, the claims, and the drawings which are briefly described hereinbelow.

BRIEF DESCRIPTION OF THE DRAWINGS

FIG. 1 is a perspective view of the rear disk brake kit of the present invention in its installed position;

FIG. 2 is an opposing perspective view of the rear disk brake kit of the present invention in its installed position;

FIG. 3 is a front plan view of the mounted disk brake assembly of FIG. 2;

FIG. 4 is a side view, sectioned along view lines 4—4 for a sectional side view of the assembly of FIG. 1;

FIG. 5 is a rear plan view of the rear disk brake assembly of FIG. 3;

FIG. 6 is a perspective view of the hub insert of the present invention; and

FIG. 7 is a perspective view of the mounting bracket plate of the present invention.

DETAILED DESCRIPTION OF THE PREFERRED EMBODIMENT

FIG. 1 shows a perspective view of the rear portion of an assembled disk brake apparatus 11 utilizing the rear disk brake kit apparatus of the present invention. In FIG. 1, the rotor assembly 13 is shown as having a conventional disk brake caliper 15 attached thereto in a braking position on either side of the outer peripheral rim portion 28 of the annular disk 27. One end portion 16 of a bracket plate 17 holds or secures the caliper 15 fixedly in place by conventional fastening means 35. A fixed vehicle axle 21 terminates in an axle flange 23 at weld 22 which is secured to a rotor mounting bracket 19 disposed on the solid inside central portion 12 of the rotor assembly 13 with the opposite end portion 14 of the bracket 17 being sandwiched between the axle flange 23 and the rotor mounting bracket 19 and fastened or secured to one another by conventional threaded fastener means 111 or the like passing through apertures 36. The rotor 13 includes a right cylindrical, elongated hub 31 terminating in a planar face 33 and having an outer peripheral cylindrical surface 32. The rear of the hub 31 forms an annular space 29 bounded between the outer surface of core 12 and mounting means 19 and the inner peripheral surface 25 of the hollow rear interior of the hub portion 31. The annular disk 27 is disposed on the inner distal end 140 of the hub 31, and it is integral therewith and perpendicular to the axis thereof so that it extends radially outward from hub 31 with the opposite sides of its outer peripheral edge 28 being disposed, within a slot 36 in the caliper 15 for braking purposes, as known in the art.

FIG. 2 shows a front perspective view of the rotor assembly 13 of FIG. 1. In FIG. 2, a cylindrical drum portion 31 is shown in more detail as is the circular planar face 33 of the drum 31. The face 33 includes a plurality of threaded apertures 18 and a central flange 37 includes a plurality of threaded apertures 41. The center of the flange 37 is provided with an aperture (not shown) through which the outer threaded end portion 39 of a drive member 121, as hereinafter described, extends. A washer 38 is passed over the end 39 and a gland nut 30 is threadedly secured to the threaded end portion 39 for fixedly securing the drive rod 121 to the rotor assembly 13.

FIG. 3 shows a front plan view of the perspective of FIG. 2. In FIG. 3, the planar face 33 of the hub 31 is shown as extending outward via the cylindrical surface or sides 32 to terminate in an outwardly disposed flange or annular disk 27 having an outer peripheral edge portion 28 an outer surface 26 and an inner surface 24. A front surface or face 33 of the hub portion 31 includes a plurality of threaded apertures 18 and a flange 37 centrally received in a recess 43 formed co-axially with the axis of the cylindrical portion 31 and the disk 27. Flange 37 is secured to a face under or within the circular recess 43 as by threaded fasteners 42 passing through apertures 41, and an aperture 106 through the center of the flange 37 is used to pass the threaded end portion 39 of the drive rod 121 therethrough, as hereinafter described. The threaded end portion 39, is secured to the front surface of the flange 37 as by washer 38 and gland nut 30. The diameter or circular portion 34 represents the axial central bore 40 passing through a solid core portion 12 of the cylindrical portion 31 for use as hereinafter described.

FIG. 4 shows a sectional view taken from the side of the rotor apparatus 13 of FIG. 3. FIG. 4 shows a generally elongated cylindrical drum portion 31 terminating in a face 33 and having an outer aperture 22 formed therein for passing the threaded end portion 39 of the rotated axle 121 therethrough. The gland nut 30 is then threaded over the threaded end portion 39 of the driven shaft 121 to operatively secure it via washer 38 to the outer surface 99 of the flange 37. The generally elongated, cylindrical portion 31 has an axial bore 34 passing therethrough, and the hub insert 91 is shown as being force-fitted within the cylindrical bore 34 of the core 12 of the hub 31. The insert 91 also has an axial central bore 44 which includes internal splined portions 131 which are provided with raised and hollowed splined portions 95 included raised portions 96 and slots or grooves 97 surrounding the sides 44 of hollow interior 95. The flange face 99 is provided with a plurality of cap screw holes or apertures 41. The flanged portion 37 of the hub insert 91 is secured to the solid core 12 of the hub 31 as by threaded fasteners 42 passing through apertures 41 after the cylindrical portion 93 is force-fitted within the bore or channel 92 so the flange 37 is disposed and force-fitted into or within the circular recess 43 formed in the face 33 of the hub 31 such that the planar outer surface 99 of the flange 37 is coplanar with the planar outer surface of the face 33. The annular space 29 about the solid core 12 of the hub 31 is shown, as is the interior surface of the hub 145. The edge 140 marks the point of demarkation of the externally extending, integral annular disk 27 having an outward surface 26 and an inwardly-facing surface 24. A mounting means 19 is formed on the solid core portion 12 of the hub 31 so that its apertures 18 are aligned with the first apertures 101 of the plate 17 and with the apertures 36 of the flanged portion 23 at the distal end of the shaft 21. A fastener device 111 having an elongated threaded stem portion 113 extends through the aligned apertures 36, 101, 18 and the head 134 is turned for securing the threaded body portion 133 therein. Drive shaft or rod 121 which is free to rotate has its splined portion 131 including grooves 133 and ridges 132, respectfully, is adapted to be received within the splined channel 95 of the insert 91 for driving same, and the outer threaded end portion 39 of the driven rod 121 includes threads thereon. The threaded outer end portion 31 extends through the aperture or bore 44 in the flange 37 and engages the gland nut 30 for removably securing the driven rod 121 to the rotor assembly for rotation with the driven shaft or rod 121.

FIG. 5 shows a front plan view of the rotor assembly 13 of FIG. 3. The front portion shows the annular disk 27 having its outer peripheral end portion 28 and its innermost portion terminating at the line of demarkation 140 to form the hollow interior 29 within the cylindrical hub 31. The mounting bracket 19 is secured to or integral with the solid core 12 of the hub 31 and is shown as being secured to one end 14 of the plate 17 by the flanged end 23 of the drive shaft housing 21 via fasteners 111 through apertures 18. The cross-section shows the stationary drive shaft 21 as having a hollow interior 122 containing a rotating shaft or drive rod 121 disposed centrally therein. The inside surface 124 of hollow shaft 21 bounds the space 122 and exterior surface 123 passes through the aperture 106 in bracket 17. The intermediate portion 103 of the plate 17 serves to space the caliper 15 in operable position mounted on the opposite curved end portion 16 of the bracket plate 17 by fastener means 35 through apertures 18 in a position axially spaced from the axis to the drive rod 121 so as to be operatively positioned with its slot 36 positioned over both sides of the outer rim portion 28 of the disk 27 for conventional disk braking purposes, as known in the art.

FIG. 6 is a perspective view of the machined hub insert 91 of the present invention. The hub insert 91 includes an elongated right cylindrical hub portion 93 terminating in a planar circular rear end portion 94. The opposite end of the cylindrical body portion 93 terminates in an annular flange 37 provided with mounting apertures 41 therethrough. A central channel or bore 34 extends through the cylindrical portion 93. The interior surface of the bore 34 is splined as by including a plurality of raised and grooved splined portions 97 and 96, respectively for operatively engaging the corresponding splines 133 and 132, respectively, at the end of the driven rod 121 or connecting the hub insert 91 to drive the hub and rotor assembly 13 via the rotation of the driven rod 121 within the hollow central channel or bore 122 of fixed axle sleeve 21. The front face 99 of flange 37 is coplanar with the hub face 33 when properly inserted with the cylindrical surface 92 fitted tightly within bore 34 and the peripheral edge 98 of insert flange 37 fitted tightly within the recess 43 in face 33 such that the rear surface 100 of flange 37 is flush against the recess face 161 and outer face 99 is coplanar with face 33.

Lastly, FIG. 7 shows the caliper mount or the mounting bracket plate 17 having a first end portion 14 provided with a group of four mounting apertures 101 and a central larger diameter aperture 106 bounded by sides 105. The intermediate portion 103 separates the first end portion 14 from the opposite end portion 16 and the opposite end portion 16 contains calipermounting apertures 101 proximate the distal recurved end 150 of end portion 16.

As previously described, the method for attaching the conversion kit of the present invention for converting a rear drum brake to a rear disk brake is briefly described hereinbelow. The kit of the present invention basically contains four pair of major components or parts including (1) a pair of rotors; (2) a pair of calipers; (3) a pair of bracket plates; and (4) a pair of hub inserts. It also includes numerous fasteners and the like, as known in the art.

In operation, the entire drum brake assembly 11 is removed from the rear wheel and the interior of the rotor assembly 13 which has previously been bored out so that the cylindrical portion 93 of the hub insert 91 can be force-fitted therein until the outer flange 37 of the hub insert 91 is force-fitted in to the flange recess 43 on the face 33 of the hub 31, and fastened therein by fastening means 42 so as to be flush against and coplanar with the outer surface or face 33 of the cylindrical hub portion 31. Fastening means 42 then secures the flange 37 and the hub insert 91 firmly to the hub 31. The mounting bracket 19 on the opposite side of the core 12 is then aligned with mounting apertures on one end 14 of the bracket plate 17 and corresponding mounting apertures 36 in the flange 23 at the end of the axle 21 and fastener means 111 are passed through the aligned apertures 36, 101, 18 for securing the axle flange 23, the bracket plate 17 and the mounting plate 19 inside the hollow end 29 of the hub core 12. The caliper 15 is attached to the opposite end 16 of the bracket plate 17 and operatively mounted in position thereon by fasteners 35 so that its slotted portion 36 operatively engages the outer edge and side portions 28 of the disk 27 for conventional disk braking purposes, as known in the art.

With this relatively simple kit even one having a minimal amount of mechanical or automotive skills is capable of converting from drum brakes to disk brakes with relatively little effort, time, or cost. The maintainability, durability and reliability of the converted disk brakes is excellent. It can also be shown that the disk brakes of the present invention are far superior to the drum brakes originally provided on such motor vehicles, particularly for off road use, dune buggy use, desert riding, hot-rodding and the like.

While specific apparatus is being shown to illustrate the preferred embodiment of the present invention, it will be realized by those skilled in the art that various modifications, configurations, changes, and sub-assemblies can be made without departing from the spirit and scope of the present invention which is limited only by the appended claims.

I claim:

1. A kit for converting the rear drum brakes of a motor vehicle originally equipped with only front disk brakes and rear drum brakes, to rear disk brakes, comprising:

a rotor including an annular disk having a first diameter, an outwardly extending cylindrical hub having a second diameter, said hub being substantially hollow and having an inwardly facing open end disposed axially on and integral with the interior edge of said annular disk, said hub further having an outwardly disposed face having an aperture means disposed axially therethrough, the inwardly facing open end of said hub being coextensive with the circular aperture in the center of said annular disk for forming a generally cylindrical annular hollow space about the inner periphery of said hub, said hub having a generally cylindrical core integral with the inwardly facing surface of said hub and generally perpendicular to the plane thereof, and said bore passing through said hollow space for forming the inner annular boundary thereof, the innermost end of said cylindrical core including a first mounting means with a plurality of mounting apertures therein, said cylindrical core having a central axial bore formed therethrough from said face substantially through said cylindrical core of said first mounting means, said core having a third diameter, and means for forming a circular recess having a fourth diameter, said fourth diameter being greater than said third diameter, within the face of said hub coaxial with said bore;

a conventional disk brake caliper means having a slot adapted to be operatively received about the peripheral end portion of said annular disk for braking purposes and caliper mounting means for positioning said caliper in its operable position;

a mounting plate having one end portion including the plurality of aperture means corresponding to the aperture means of said first mounting means and an opposite end portion having second aperture means thereon, said second aperture means corresponding to the aperture means of said caliper mounting means, and further including fastening means adapted for engaging the aperture means of said opposite end of said mounting plate and of said caliper means for fixedly securing said caliper means in place for proper disk brake action;

a hub insert means having a generally cylindrical hub portion, said hub portion having a diameter substantially equal to but slightly greater than said diameter, said hub insert means further including an integral circular flange at one end thereof, said flange having a diameter substantially equal to but slightly greater than the diameter than said fourth diameter, said flange having an aperture means operatively disposed axially therethrough, said flange and said cylindrical hub portion having a circularly splined channel formed therethrough and coaxial with the axis thereof, said cylindrical hub portion being force-fitted into said central axial bore of said hub core until said flange is force-fitted into said recess and the outer face of said flange is coplanar with the face of said hub, and further including fastening means for operatively coupling the hub insert to said rotor;

fixed axle casing means including mounting means on the outermost end thereof said axle-mounting means including a plurality of apertures therethrough corresponding to said apertures of said one end of said mounting plate and of the mounting means of the core adapted to be aligned therewith, and further including fastener means for operatively engaging said aperture means and securing said mounting means of said fixed axle to one end of said bracket plate, and the mounting means of said hub fixedly securing the normally-splined outer end portion of the drive axle within said fixed axle being operatively disposed in operable engagement within the central splined bore of said core with a threaded end portion of said drive axle forward of said splined end on said drive axle extending through the aperture of said flange, said flange further including gland nut means for threadedly securing the threaded end of said drive axle to the outer face of said flange.

2. A kit for converting the rear drum brakes of a motor vehicle originally equipped with front disk brakes and rear drum brakes only, to rear disk brakes comprising:

a rotor including a round, annular disk portion having an inner and an outer side, a generally cylindrical hub portion extending centrally therefrom, perpendicular thereto, and integral therewith, a hollow annular space opening on said inward face and extending a predetermined distance into a cylindrical portion, and a central mounting portion disposed on the inwardly facing portion of said cylindrical portion, said central portion of said cylindrical portion having a central cylindrical core passing therethrough and a circular recess having a diameter greater than that of said core disposed centrally on the outer face of the opposite end of said cylindrical portion, said central bore, said cylindrical portion, said recess, said annular disk and said generally cylindrical portion being coaxial with one another;

a pair of calipers for operatively engaging the outer peripheral edges of the outer peripheral sides of said disk for braking purposes;

a mounting bracket adapted to be secured to said mounting means; and a hub insert having a cylindrical stem portion terminating in an annular circular flange having a greater diameter than said cylindrical stem portion, said stem portion and said flange including a central splined channel therethrough, said cylindrical portion being force-fitted into the central channel of said hub until said flange is force-fitted into said recess and the outer surface of said flange is coplanar with the outer surface of said hub portion;

means for fastening said flange to the outer surface of said cylindrical portion beneath said recess;

the inward open end of said splined central channel being adapted to operatively receive the splined end portion of a drive rod whose threaded end portion passes through an aperture in said flange, and said flange includes a gland nut fastening means for operatively engaging the threaded end portion of said driven rod for securing same to said rotor;

a mounting bracket having first mounting means at one end adapted to be aligned with the mounting means of the open end portion of said hub and second mounting means at the opposite end adapted to be aligned with the mounting means of said caliper;

fastening means for fixedly securing the first mounting means to said hub and the second mounting means of said bracket for fixedly securing said caliper in operable braking position to the opposite end of said plate;

aperture means operably disposed on the innermost end of the hollow axle surroundings said drive rod and adapted to be aligned with the apertures of said first end of said plate and with the apertures of the mounting means in the interior end of said core; and fastening means adapted to be operatively received within said aligned apertures and fixedly secured thereto.

3. A conversion kit means for use with a motor vehicle originally equipped with only front disk brakes and rear drum brakes, for converting the rear drum brakes to rear disk brakes, comprising:

a pair of rotors each including a generally cylindrical hub having a generally cylindrical core, means for forming a hollow annular space between said core and the periphery of said hub, one end of said hub terminating in an integral face generally perpendicular to the axis of said hub and the opposite end of said core terminating in a first mounting means, said hub including an annular disk integral with said opposite end of said hub and extending radially outwardly therefrom, means for forming an axial cylindrical bore having a first diameter through said core and means for forming a circular recess in said face coaxial with said core, said recess having a second diameter where said second diameter is greater than said first diameter;

a pair of calipers each having a caliper mounting means and a braking slot for operatively engaging the outer peripheral side portions of said annular disk for braking purposes;

a pair of bracket plates each having one end portion provided with mounting means corresponding to said hub-mounting means, an opposite end portion provided with mounting means corresponding to said caliper-mounting means and a midportion for spacing said caliper-mounting means a predetermined radial distance from the axis of said hub for operatively mounting said caliper means in a braking position about the outer peripheral side portions of said annular disk; and hub insert means having an elongated cylindrical portion having a third diameter substantially equal to and slightly greater than said first diameter and an annular circular flange operatively disposed at one end of said elongated portion and having a fourth diameter substantially equal to but slightly greater than said second diameter, said cylindrical portion being force-fitted into said axial bore until said flange is forcefitted into said recess and the face of said flange is coplanar with the face of said cylindrical portion;

means for operatively securing said flange to said cylindrical hub and fixedly positioning same, said hub insert means including a central, axial, splined channel means extending axially therethrough for operatively matingly receiving the splined end portion of a driven shaft of the motor vehicle theein, said driven shaft terminating in a threaded end portion, and said flange including aperture means for receiving said threaded end portion therethrough, said flange further including gland nut means for threadedly engaging said threaded end portion of said driven rod and for removably securing same to said rotor, and first mounting means, said bracket plate-mounting means and a mounting means at the distal end of a fixed axle surrounding said driven rod being axially aligned with one another and including means for operatively securing same fixedly together.

4. The method of converting rear drum brakes to rear disk brakes on a motor vehicle which is ordinarily equipped only with front disk brakes, comprising the steps of:

removing the rear drum brakes from the rear wheels of said motor vehicle;

providing a pair of rotor assemblies each having an annular disk;

boring a central axial channel through each of said rotor assemblies, said bore having a first diameter;

forming a circular annular recess on the outer planar face of each of said rotor assemblies;

boring an aperture through the center of said recess such that said central axial channel is co-extensive co-axially therewith;

machining a pair of hub inserts each having a generally elongated cylindrical portion having an annular integral connection flange on one end thereof, said cylindrical portion having a diameter substantially equal to but greater than said first diameter and said flange having a diameter substantially equal to but greater than the diameter of said circular recess;

boring a central, axial, generally circular bore completely through said insert;

forming interiorly disposed splined means within said axial bore of said hub insert;

force-fitting said cylindrical portion of said hub insert into said central axial channel through the channel of said recess until the outer surface of said flange is coplanar with the face of said outer planar face;

securing said flange to said rotor assembly;

providing a pair of disk brake calipers having a slot for operatively engaging the outer peripheral sides of said annular disk and a caliper fastening means;

providing a bracket having a first set of mounting aperture means on one end portion and a second set of mounting aperture means on the opposite end portion;

disposing axial-mounting means on the end of said core opposite said face, said mounting means including a first set of mounting apertures thereon;

inserting the splined end portion of a drive rod into the splined axial bore of said hub insert;

pressing the distal threaded end portion of said drive rod through the aperture in the circular flange;

securing said drive rod to said hub assembly by threadedly engaging a nut means over the protruding end thereof and securing same to the outer surface of said flange;

securing said flange to said rotor assembly;

combining the first mounting means at the end of said rotor assembly with the first set of mounting apertures of the first end of said bracket and the mounting means apertures of the end of the fixed shaft encasing said driver;

securing fastening means through said aligned apertures for operatively securing said mounting means fixedly together; and aligning the mounting means apertures of said caliper with the mounting apertures at the opposite end of said bracket;

inserting fastening means within said aligned apertures for fixedly securing said caliper ot the end of said bracket and operably positioning same to locate the caliper slot over the peripheral edge portion of the rotor disk for braking purposes.

* * * * *